May 14, 1963     R. P. ALER     3,089,529
WHEEL TRACTION AID
Filed Aug. 10, 1962
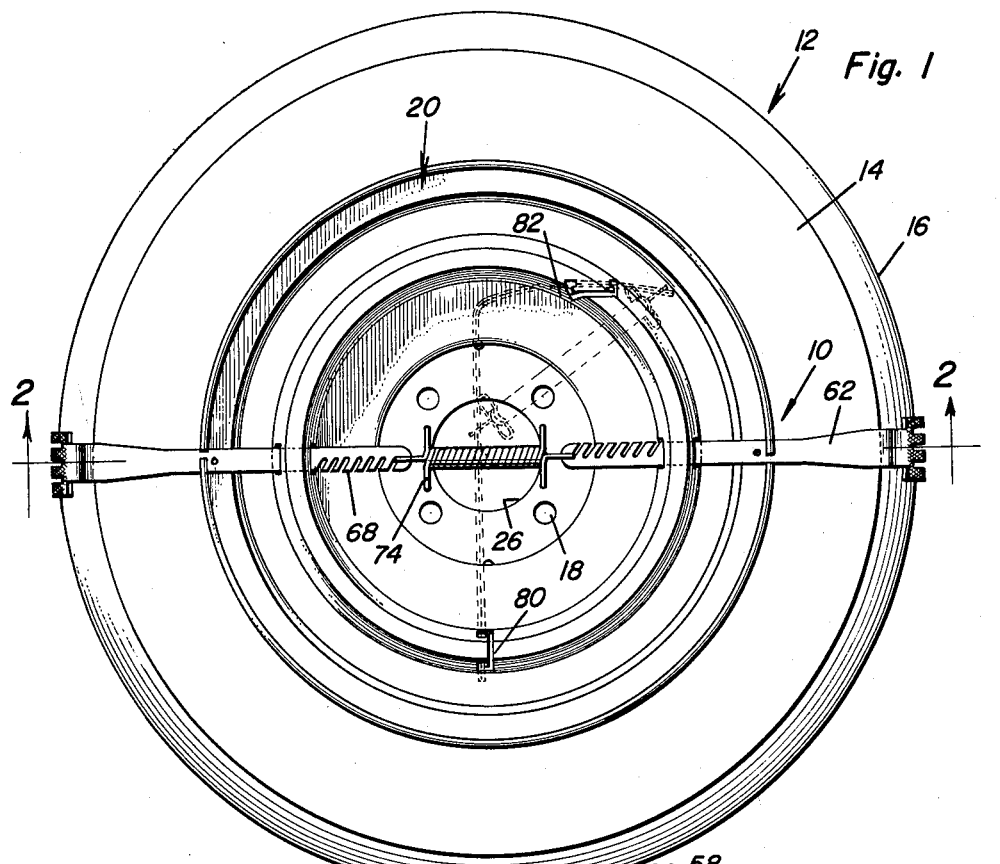
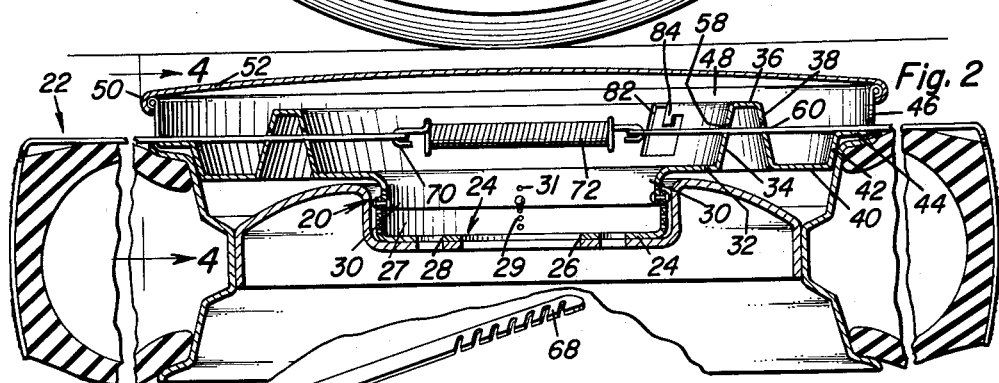
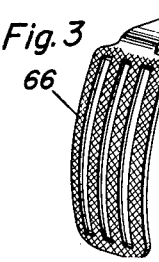
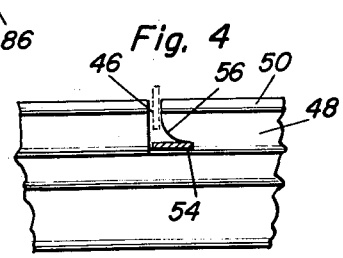
Richard P. Aler
INVENTOR.

United States Patent Office 3,089,529
Patented May 14, 1963

3,089,529
WHEEL TRACTION AID
Richard P. Aler, 130 Stevenson Lane, Baltimore, Md.
Filed Aug. 10, 1962, Ser. No. 216,190
6 Claims. (Cl. 152—216)

The present invention generally relates to an attachment for vehicle wheels such as those normally employed on road vehicles including automobiles, trucks, buses and the like and more particularly, the present invention relates to an attachment which will increase and aid in the traction of the vehicle's wheels with the roadway or other surface which is to be traversed by the vehicle.

An object of the present invention is to provide a traction aid which not only effectively produces sufficient traction for the vehicle wheels but which is also very simple in construction, quite easy to install, easy to convert to inoperative storage condition, long-lasting and fool-proof in operation and relatively inexpensive to manufacture.

Another object of the present invention is to provide a vehicle wheel traction aid having at least one pair, but not limited to one pair, of radially extending arms having axially inwardly extending radially outer end portions adapted to extend over the tread portion of a vehicle tire. The radially inner end portions of the arms are slidably received in apertures formed in a mounting plate and a tension spring inter-connects the radially inner end portion of diametrically opposed arms so that the arms will be retained in position but still be capable of radial movement due to normal flexure of the tire during rotation thereof in a conventional manner. The spring serves to enable easy mounting and dismounting of the arms and also secures the arms in position and enables the relative movement therebetween.

Still another object of the present invention is to provide a vehicle traction aid having a very minimum of parts including a disc-like mounting plate provided with a peripheral flange for receiving a cover plate for concealing the spring and radially inner end portions of the arms when in operative position and for concealing the entire assembly when the arms and spring are disposed in stored condition thereby providing an attractive cover disc capable of being used as the normally provided hubcap thereby enabling the present invention to be permanently installed on the vehicle or at least installed at the beginning of the winter season when icy conditions or slippery roadways may be expected to be encountered.

Another object of the present invention is to provide a wheel traction aid having radially movable arms and connected by a spring at the radially inner end thereof with the spring being adjustably attached to the arms for enabling variation in the tension of the spring and also enabling the arms to engage vehicle wheels of different diameters thus enabling the device to be installed on various types of vehicles having different size vehicle wheels and tires.

A further important object of the invention is to provide a traction aid with an adapter attached to the mounting plate at the time of installation whereby an adapter conforming to the lug pattern and shape characteristics of the particular vehicle may be attached in an adjusted position and thereafter form an integral part of the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of the traction aid mounted on a vehicle wheel illustrating the arms in their stored position in dotted line and with the cover removed;

FIGURE 2 is a vertical sectional view taken substantially upon a plane passing along section line 2—2 of FIGURE 1 illustrating the structural details of the traction arms and the mounting plate therefor;

FIGURE 3 is a perspective view of one of the traction arms; and

FIGURE 4 is a detailed sectional view taken substantially upon a plane passing along sectional line 4—4 of FIGURE 2 illustrating further structural details of the relationship between the mounting plate and the radial arm.

Referring now specifically to the drawings, the numeral 10 generally designates the wheel traction aid of the present invention illustrated in its relationship to a vehicle wheel generally designated by numeral 12 which includes the usual pneumatically inflated tire 14 having a tread surface 16. There is provided a wheel rim and lug assemblies for retaining the wheel rim on the brake drum in a conventional manner. The lug assemblies are designated by numeral 18 and are conventional both as to their shape and orientation. It will be appreciated that the present invention may be installed on vehicles having various orientations of lug patterns by merely adapting the hole pattern in the traction aid to the lug bolt pattern.

The traction aid of the present invention includes a mounting plate generally designated by numeral 20 and a pair of traction arms generally designated by numeral 22. The mounting plate 20 includes a cylindrical cup shaped member 24 having a central enlarged aperture 26 for receiving the normally provided bearing receiver of the brake drum or the like on the vehicle structure. An axially outwardly extending flange 27 forms part of the cup 24 and includes a plurality of sets of spaced apertures 29. Also there is provided a plurality of apertures 28 arranged in a pattern to be disposed over the lug bolts 18. The lugs or nuts are then placed on the lug bolts 18 in the normal manner for retaining the cup in position. The number of apertures 28 may be varied with the number of lug bolts and the orientation thereof may be varied depending upon the lug bolt pattern to which the cup is to be attached.

The mounting plate 24 also includes a cylindrical axially outwardly extending flange 30 having a plurality of sets of apertures 31 for alignment with selective apertures 29 in flange 27 after which rivets or equivalent fasteners are used to rigidly secure flanges 27 and 30 in adjusted position for varying the axial offset or standoff for the mounting plate so that it conforms with the configuration of a particular wheel rim thereby requiring that only a supply of adapter cups be kept in stock. The axially outer end of the cylindrical flange 30 is integral with a radially outwardly extending peripheral flange or plate 32. Formed integrally with the peripheral edge of the flange or plate 32 is an axially outwardly extending and radially outwardly inclined flange 34 terminating in a radially outwardly extending flange 36 at the axially outer end thereof parallel with the flange 32 and the circular plate 34. Integral with the radially outer edge of the flange 36 is an axially inwardly extending flange 38 which inclines radially outwardly and cooperates with the flange 34 and the flange 36 to form substantially an annular axial outwardly extending projection of truncated conical cross-sectional configuration. The axially inner edge of the flange 38 is generally in radial alignment with flange 34 and a radially outwardly extending flange or annular plate 40 is integral therewith. The radially outwardly extending flange or plate 40 is parallel with and in radial alignment with the flange 32. The radially outer periphery of the flange 40 is provided with an axially outwardly extending flange 42 which is generally parallel with the flange 34 in that it is inclined radially outwardly but the flange 42 is substantially one-half of the width of the flange 34 as illustrated in FIGURE 2.

At the axially outer end of the flange 42 there is provided a radially outwardly extending flange 44 that is in parallel relation to the flanges 32 and 40 and which has the axially outer surface thereof in alignment with an axial slot-like opening 46 in an axially outwardly extending flange 48 which extends axially outwardly beyond the plane of the flange 36 and which terminates in a rolled edge 50 which is rolled radially outwardly thus forming a peripheral radially outwardly extending means for receiving a cover plate 52 for covering and concealing the interior of the mounting plate. As illustrated in FIGURE 4, the slot-like opening 46 is provided with an undercut axially inner end portion 54 with one side edge thereof being rounded as at 56.

The flange 34 is provided with an aperture 58 and the flange 38 is provided with an aperture 60 which apertures are circumferentially elongated and are in the form of slots and are in radial alignment with the slot-like opening 46 and especially the undercut portion 54 thereof. Thus, the slot-like openings 58 and 60 and the undercut portion 54 of the vertical slot 46 all are in radial alignment with the axially outer surface of the flange 44 generally being in radial alignment therewith.

Each of the traction arms 22 includes an elongated strap number 62 of rectangular cross-sectional configuration. The radially outer end of the strap 62 is provided with an axially inwardly extending end portion or traction member 64 in the form of a plate which is arcuately curved slightly to conform to the normal contour of the tread surface of the tire. A plurality of longitudinally elongated slots 66 are provided in the traction member 64 to prevent the traction number 64 from becoming filled with or caked over with packed snow, ice, or the like, and the radially outer surface is preferably roughened.

The arms 22 are arranged with the straps 62 slidably received within the aligned apertures 58 and 60 and the undercut portion 54 of the notch 46 so that the straps 62 may be moved radially inwardly and outwardly in relation to the vehicle wheel. The radially inner end of the strap 62 is provided with a plurality of longitudinally spaced apertures 68 for receiving the hooked-shaped ends 70 of a tension coil spring 72 which resiliently biases the arms 22 towards each other thereby resiliently urging the member 64 into contact with the tread surface 16 of the tire 14. Each end coil of the spring 72 has a pair of diametrically opposed projections 74 formed integrally therewith for forming finger grips by virtue of which the spring 72 may be elongated for engaging and disengaging the hook-shaped end 70 with one of the apertures 68 thus enabling the tension of the spring 72 to be varied and enabling the device to be assembled with wheel diameters of various sizes, and the holes 60 are diagonally inclined slots.

The slot-like opening 46 enables the device to be easily assembled since it is only necessary to engage the strap member 62 therewith in the manner illustrated in dotted line in FIGURE 4 after which the strap member is pivoted about its longitudinal axis as it is moved into position. This enables the traction member 64 to be swung across the tread surface and the strap member 62 is then moved radially inwardly through the apertures 58 and 60. Thus, the straps 62 are guided at three points radially of the vehicle wheel and since the straps 62 are free floating in the slot-like apertures, the spring 72 will continuously retain the traction member 64 snugly engaged with the tread surface while yet enabling the tire to flex in its normal manner of use. In addition, the spring will have sufficient strength to prevent any radially outward movement of the arms even at relatively high rotational speeds of the vehicle wheel. The various components of the invention may be constructed of readily available materials with the mounting plate being formed by a stamping die or the like and the arms 22 may also be formed quite conventionally thereby forming a quite simple traction aid and one which will be long-lasting, easy to install and relatively inexpensive to manufacture.

For storing the arms 22 when they are not needed, the spring 72 is disconnected and the arms 22 removed in an obvious manner. The arms are then nested in relation to each other and disposed diametrically of the mounting plate 20 with the radially inner end portion of the straps 62 being received in an undercut slot-like opening 80 while the traction members 64 are received in a similar undercut slot-like opening 82. The slot-like openings 80 and 82 are of a configuration as illustrated in FIGURE 2 in which the undercut portion is provided with an axially inwardly extending projection 84 at the edge thereof communicating with the slot thus forming a lock for retaining the arms 22 in position when they are brought into registry with the slot-like opening. Thus, the traction member 64 may be initially engaged with the slot-like opening with the axially outer edge thereof brought into registry behind the projection 84 and the radially inner portions of the straps 62 then pushed axially inwardly into the slot-like opening 82 and moved into registry behind similar projections to those designated as 84. The tension coil spring 72 is then placed across the axially outer surface of the flange 36 with one end thereof engaging one of the slots 66 and the inner end thereof engaging an aperture 86 formed in the strap 62 whereby the arms 22 will be biased axially outwardly into frictional engagement with the axially outer edge of the undercut portion of the slot-like openings 80 and 82 thus securely storing the arms in position so that they will not rattle to any great extent.

While this method has been illustrated as the exemplary of the manner of storing the arms, it will be appreciated that the arms may be completely removed along with the springs and stored in a suitable portion of the vehicle such as in the trunk compartment thereby enabling the mounting plate to be permanently installed and the arms and spring removed to completely eliminate any possibility of rattles or wear during extended use of the vehicle in periods when slippery roadways will not be encountered.

While the present invention is primarily intended for use with passenger type automotive vehicles, it may also be employed with various types of land vehicles subject to loss of traction due to slippery roadways caused by ice, snow and the like and also due to mud or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle wheel traction aid comprising a mounting plate adapted to be secured to the vehicle wheel by use of the lug bolts and nuts, a pair of radially extending traction arms mounted on the mounting plate for radial reciprocation, each arm including a traction member forming an outer end for extending transversely of the tread face of a tire, and resilient means interconnecting the inner ends of the arms to retain the arms in assembled condition on the vehicle wheel and enabling the arms to move independently radially inwardly and outwardly, said mounting plate including an annular outward projection having spaced flanges and spaced apertures therein slidably receiving the radially extending arms, said mounting plate being provided with a peripherally extending outwardly projecting flange spaced outwardly from the projection and including a slot with an undercut portion in alignment with the apertures in the projection for slidably and detachably receiving the traction arm.

2. The structure as defined in claim 1 wherein the traction arm includes a strap-like member extending radially inwardly and including a plurality of longitudinally spaced apertures in the inner end thereof for adjustable connection with the resilient means thereby enabling the tension thereof to be varied and thereby enabling the traction aid to be employed with vehicle wheels having different diameters.

3. The structure as defined in claim 2 wherein said resilient means includes a tension coil spring having a hook end on each end thereof, and fingergrips on each end of the spring for enabling the spring to be elongated for engaging the hooks with the apertures, said spring preventing outward movement of the arms during rotation of the wheel and cooperating with the arms to absorb the shock forces created by engagement of the arms with the roadway.

4. The structure as defined in claim 2 wherein said apertures in the arm are each in the form of inclined slots having an axis inclined toward the center of the wheel for laterally receiving the hook ends of the spring.

5. The structure as defined in claim 1 wherein said mounting plate also includes a cup-shaped adapter having a plurality of apertures for receiving a particular pattern of lug bolts, said mounting plate including an annular member rigidly attached to said adapter.

6. A vehicle wheel traction aid comprising a mounting plate adapted to be secured to the vehicle wheel by use of the lug bolts and nuts, a pair of radially extending traction arms mounted on the mounting plate for radial reciprocation, each arm including a traction member forming an outer end for extending transversely of the tread face of a tire, and resilient means interconnecting the inner ends of the arms to retain the arms in assembled condition on the vehicle wheel and enabling the arms to move independently radially inwardly and outwardly, said mounting plate including a cup-shaped adapter having a plurality of apertures for receiving a particular pattern of lug bolts, said mounting plate including an annular member rigidly attached to said adapter, said annular member and adapter having telescopically engaged flanges, each flange having a plurality of spaced apertures receiving fastening means rigidly securing the annular member and adapter together in adjusted position.

References Cited in the file of this patent

UNITED STATES PATENTS

| | | |
|---|---|---|
| 2,397,277 | Lawrence | Mar. 26, 1946 |
| 2,528,165 | Nickerson | Oct. 31, 1950 |
| 2,867,259 | Barron | Jan. 6, 1959 |
| 2,897,868 | Putt et al. | Aug. 4, 1959 |
| 3,049,163 | Ryan | Aug. 14, 1962 |